United States Patent [19]

Schmidlin

[11] Patent Number: 4,814,796

[45] Date of Patent: Mar. 21, 1989

[54] DIRECT ELECTROSTATIC PRINTING APPARATUS AND TONER/DEVELOPER DELIVERY SYSTEM THEREFOR

[75] Inventor: Fred W. Schmidlin, Pittsford, N.Y.

[73] Assignee: Xerox Corporation, Stamford, Conn.

[21] Appl. No.: 926,169

[22] Filed: Nov. 3, 1986

[51] Int. Cl.[4] .............................................. G01D 15/00

[52] U.S. Cl. .................................. 346/155; 346/160.1

[58] Field of Search ...................... 346/155, 154, 160.1, 346/158; 305/3 DD, 14 D; 400/119; 101/DIG. 13

[56] References Cited

U.S. PATENT DOCUMENTS

| | | | |
|---|---|---|---|
| 3,689,935 | 9/1972 | Pressman et al. | 346/74 ES |
| 4,491,855 | 1/1985 | Fujii et al. | 346/154 |
| 4,568,955 | 2/1986 | Hosoya et al. | |
| 4,615,606 | 10/1986 | Nishikawa | 355/3 DP |

FOREIGN PATENT DOCUMENTS

| | | | |
|---|---|---|---|
| 58-122569 | 7/1983 | Japan | 346/153.1 |
| 58-122882 | 7/1983 | Japan | |

OTHER PUBLICATIONS

USSN 718,615, "Development Apparatus"; Ying Wei Lin.

*Primary Examiner*—Arthur G. Evans

[57] ABSTRACT

Direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign and size toner. To this end, the developer delivery system includes a conventional magnetic brush which delivers toner to a donor roll structure which, in turn, delivers toner to the vicinity of apertures in the printhead structure.

21 Claims, 1 Drawing Sheet

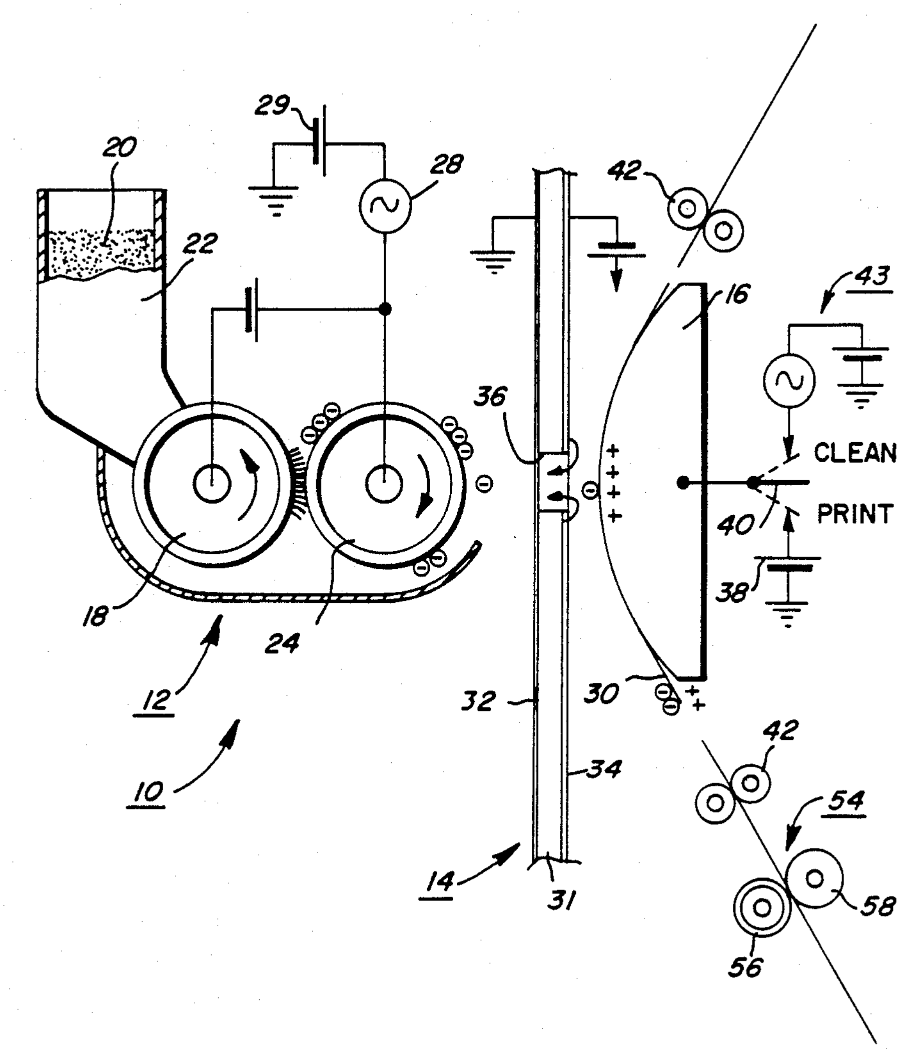
29
20
28
22
42
16
43
36
CLEAN
40
PRINT
38
18
24
12
30
32
10
42
34
54
14
31
58
56

DIRECT ELECTROSTATIC PRINTING APPARATUS AND TONER/DEVELOPER DELIVERY SYSTEM THEREFOR

BACKGROUND OF THE INVENTION

This invention relates to a direct electrostatic printing device and, more particularly, to a developer or toner delivery system for presenting developer or toner to an electronically addressable printhead utilized for depositing developer in image configuration on plain paper substrates.

Of the various electrostatic printing techniques, the most familiar is that of xerography wherein latent electrostatic images formed on a charge retentive surface are developed by a suitable toner material to render the images visible, the images being subsequently transferred to plain paper.

A less familiar form of electrostatic printing is one that has come to be known as direct electrostatic printing (DEP). This form of printing differs from the aforementioned xerographic form in that the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device, the supply of the toner to the control member is not uniformly effected and irregularities are liable to occur in the image on the image receiving member. Highspeed recording is difficult, and moreover, the openings in the printhead are liable to be clogged by the toner.

U.S. Pat. No. 4,491,855 issued on Jan. 1, 1985 in the name of Fujii et al discloses a method and appartus utilizing a controller having a plurality of openings or slit-like openings to control the passage of charged particles and to record a visible image by the charged particles directly on an image receiving member. Specifically disclosed therein is an improved device for supplying the charged particles to a control electrode that has allegedly made high-speed and stable recording possible. The improvement in Fujii et al lies in that the charged particles are supported on a supporting member and an alternating electric field is applied between the supporting member and the control electrode. Fujii et al purports to obviate the problems noted above with respect to Pressman et al. Thus, Fujii et al alleges that their device makes it possible to sufficiently supply the charged particles to the control electrode without scattering them.

U.S. Pat. No. 4,568 955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An AC and a DC source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quantity of toner. In the toner reservoir are disposed a toner carrying plate as the develope carrying member, secured in a position such that it faces the end of the recording electrode at a predetermined distance therefrom and a toner agitator for agitating the toner.

The toner carrying plate is made of an insulator. The toner carrying plate has a horizontal portion, a vertical portion descending from the right end of the horizontal portion and an inclined portion downwardly inclining from the left end of the horizontal portion. The lower end of the inclined portion is found near the lower end of the inclined bottom of the toner reservoir and immersed in the toner therein. The lower end of the vertical portion is found near the upper end of the inclined portion and above the toner in the reservoir.

The surface of the toner carrying plate is provided with a plurality of uniformly spaced parallel linear electrodes extending in the width direction of the toner carrying plate. At least three AC voltages of different phases are applied to the electrodes. The three-phase AC voltage source provides three-phase AC voltages 120 degrees out of phase from one another. The terminals are connected to the electrodes in such a manner that when the three-phase AC voltages are applied a propagating alternating electric field is generated which propagates along the surface of the toner carrying plate from the inclined portion to the horizontal portion.

The toner which is always present on the surface of lower end of the inclined portion of the toner carrying plate is negatively charged by friction with the surface of the toner carrying plate and by the agitator. When the propagating alternating electric field is generated by the threephase AC voltages applied to the electrodes, the toner is allegedly transported up the inclined portion of the toner carrying plate while it is oscillated and liberated to be rendered into the form of smoke between adjacent linear electrodes. Eventually, it reaches the horizontal portion and proceeds therealong. When it reaches a development zone facing the recording electrode, it is supplied through the opening to the ordinary sheet as recording medium, whereby a visible image is formed. The toner which has not contributed to he formation of the visible image is carried along such as to fall along the vertical portion and then slide down into the bottom of the toner reservoir by the gravitational force to return to a zone, in which the lower end of the inclined portion of the toner carrying plate is found.

Notwithstanding the advancements made in direct electrostatic printing, I have discovered that two fundamental problems preventing the practical realization of printing directly on paper by electrostatic modulation of toner flow through an apertured printhead. They are the accumulation of toner on the printhead with eventual plugging of apertures and the inability to deliver the toner to the vicinity of the printhead apertures with sufficiently weak fields or sufficiently weak oscillating energy.

Recent observations by me indicate that the aforementioned accumulation of toner on the printhead is due to the rapid accumulation of wrong sign toner or developer on the printhead on the substrate side thereof. This accumulation can build up to the point where it blocks off the apertures. Wrong sign toner is that toner which is charged to the sign opposite to the toner which is deposited on the substrate such as plain paper. As will be disclosed hereinafter in detail, I solved the problem of aperture blocking due to the accumulation of wrong sign toner on the printhead by providing a toner delivery system that minimizes the delivery of wrong sign toner to the printhead.

The problem of aperture contamination or blocking has been addressed as indicated in Japanese Laid Open Publications Nos. 58-122569 and 58-122882 dated July 21, 1983. The former publication discloses the direction of air by means of a fan between a control member and a charged particle generating source when a recording member is not disposed in the recording position. The fan is cycled on and off so as not to be on when images are being formed thereby eliminating the possibility of image disturbance. The latter publication discloses the elimination of any extraneous substance in the openings of a control member by the use of spark discharges between the pair of electrodes forming the control member thereof. The spark discharge can also occur between a charged particle source or opposite electrode and the pair of electrodes or between the charged particle source or opposite electrode and at least one of the pair of electrodes. The spark discharges are also effected by applying a higher cleaning voltage to a rear electrode to which a recording voltage is normally applied. As stated in the publication, the recording voltage applied to the rear electrode with the base electrode grounded is 500 volts volts, while the voltage applied during cleaning is 1500.

As will be appreciated, a direct electrostatic printing system which utilizes a developer delivery system adapted to minimize the delivery of the wrong sign and oversized toner to the printhead is highly desirable. This would minimize the accumulation or buildup of such developer on the printhead thereby minimizing the need for printhead cleaning. Moreover, a delivery system capable of delivering the proper sign and size toner which is accomplished at relatively weak field levels or with weak oscillating energy is also highly desirable.

It is known to remove contaminants such as debris prior to the use of the developer for its intended purpose. Such an arrangement is disclosed in U.S. patent application Ser. No. 718,615 wherein a biased roller is disposed in the developer housing at a location suitable for removing debris such as paper fibers from the toner prior to use for developing the images. The foregoing application does not involve the type of printing herein contemplated nor does it suggest the type of toner delivery system disclosed and claimed herein. Its relevance is limited to the teaching of altering the composition of the toner prior to image development.

BRIEF DESCRIPTION OF THE INVENTION

The present invention provides a developer or toner delivery system disposed to one side of a printhead and an electrically biased shoe or electrode which is disposed to the opposite side of the printhead from the toner delivery system.

The toner or developer delivery system includes a conventional magnetic brush supported for rotation adjacent a supply of developer contained in a hopper. A developer donor roll is supported for rotaton intermediate the magnetic brush and the printhead structure. The donor roll structure is spaced from the printhead approximately 0.003–0.015 inch. The magnetic brush has a DC bias of about 100 volts applied thereto via a DC voltage source. An AC voltage of about 400 volts applied to the donor roll creates a localized field between the donor roll and the printhead causing toner to jump to the vicinity of apertures in the printhead. A DC voltage of about 20 volts is applied to the donor roll in series with the AC voltage to avoid collection of right sign toner on the shield electrode of the printhead.

The foregoing developer delivery or supply system provides an improved arrangement for controlling the mass and charge of the toner and, in particular, the percentage of wrong sign toner that is ultimately presented to the printhead. The use of magentic brush results in favorable (i.e. a narrow) charge distribution in the toner due to interaction of the conventional toner/carrier mix used. A narrow charge distribution results in a very low percentage of wrong sign toner being delivered to the printhead. This results in a reduction in the contamination rate of the the printhead. The magnetic brush effects the application of approximately a monolayer of toner to the donor roll, the DC voltage controlling the mass per unit of area of toner deposited on the donor roll. The use of the magnetic brush loaded donor enables the use of toner which can be jumped to the printhead with weaker electric fields than those commonly used in single component jumping development systems.

DETAILED DESCRIPTION OF THE DRAWINGS

The FIGURE is a schematic illustration of a printing apparatus representing the present invention.

DESCRIPTION OF THE PREFERRED EMBODIMENT OF THE INVENTION

Disclosed in the Figure is an embodiment of a direct electrostatic printing apparatus 10 representing the invention.

The printing apparatus 10 includes a developer delivery system generally indicated by reference character 12, a printhead structure 14 and a backing electrode or shoe 16.

The developer delivery system 12 includes a conventional magnetic brush 18 supported for rotation adjacent a supply of developer 20 contained in a hopper 22. A developer donor roll 24 is supported for rotation intermediate the magnetic brush 18 and the printhead structure 14. The donor roll structure which is preferably coated with Teflon-S (Trademark of E.I. duPont) is spaced from the printhead approximately 0.003 to 0.015 inch. Teflon-S is a tetrafluoroethylene fluorocarbon polymer that is loaded with carbon black. The magnetic brush has a DC bias of about 100 volts applied thereto via a DC voltage source 26. An AC voltage of about 400 volts provided by source 28 with a DC bias of 20 volts provided by source 29 is applied to the donor roll 24. The applied voltages are effective to cause attraction of developer to the brush 18 and to cause transfer of a monolayer of toner to the donor roll 24 from the brush 18. The monolayer is subsequently jumped to the vicinity of the apertures of the printhead. The 20 volts DC bias precludes collection of right sign toner on the shield electrode of the printhead.

The developer preferably comprises any suitable isulative non-magnetic toner/carrier combination having Aerosil (Trademark of Degussa, Inc.) contained therein in an amount equal to ½% by weight and also having zinc stearate contained therein in an amount equal to 1% by weight.

The foregoing developer delivery or supply system provides an improved arrangement for controlling the mass and charge of the toner and, in particular, the percentage of wrong sign toner that is ultimately presented to the printhead 14. The toner/carrier mix used results in favorable charge distribution in the toner. This results in a reduction in the contamination rate of the printhead.

The printhead structure 14 comprises a layered member including an electrically insulative base member 31 fabricated from a polyimide film approximately 0.001 inch thick. The base member is clad on the one side thereof with a continuous conductive layer or shield 32 of aluminum which is approximately one micron thick. The opposite side of the base member 30 carries segmented conductive layer 34 thereon which is fabricated from aluminum. A plurality of holes or apertures 36 (only one of which is shown) approximately 0.007 inch in diameter are provided in the layered structure in a pattern suitable for use in recording information. The apertures form an electrode array of individually addressable electrodes. With the shield grounded and zero volts applied to an addressable electrode, toner is propelled through the aperture associated with that electrode. The aperture extends through the base 31 and the conductive layers 32 and 34.

With a negative 350 volts applied to an addressable electrode toner is prevented from being propelled through the aperture. Image intensity can be varied by adjusting the voltage on the control electrodes between 0 and minus 350 volts. Addressing of the individual electrodes can be effected in any well known manner know in the art of printing using electronically addressable printing elements.

The electrode or shoe 16 has an arcuate shape as shown but as will be appreciated, the present invention is not limited by such a configuration. The shoe which is positioned on the opposite side of a plain paper recording medium 30 from the printhead deflects the recording medium in order to provide an extended area of contact between the medium and the shoe.

The recording medium 30 may comprise cut sheets of paper fed from a supply tray 40. The sheets of paper which are spaced from the printhead 14 a distance in the order of 0.005 to 0.030 inch as they pass therebetween. The sheets 30 are transported in contact with the shoe 16 via edge transport roll pairs 42.

During printing, the shoe 16 is electrically biased to a DC potential of approximately 400 volts via a DC voltage source 38.

Periodically, a switch 40 is actuated in the absence of a sheet of paper between the printhead and the shoe such that a DC biased AC power supply 43 is connected to the the shoe 16 to effect cleaning of the printhead. The voltage supplied by the source 43 is of the same frequency as that (i.e. source 28) used to jump the toner from the toner supply system but it is 180 degrees out of phase with it. This causes the toner in the gap between the paper and the printhead to oscillate and bombard the printhead.

Momentum transfer between the oscillating toner and any toner on the control electrodes of the printhead causes the toner on the control electrodes to become dislodged. The toner so dislodged is deposited on the substrates subsequently passed over the shoe 16.

At the fusing station, a fuser assembly, indicated generally by the reference numeral 54, permanently affixes the transferred toner powder images to sheet 30. Preferably, fuser assembly 54 includes a heated fuser roller 56 adapted to be pressure engaged with a back-up roller 58 with the toner powder images contacting fuser roller 56. In this manner, the toner powder image is permanently affixed to copy substrate 30. After fusing, chute, not shown, guides the advancing sheet 30 to catch tray 62 for removal from the printing machine by the operator.

What is claimed is:

1. Printing apparatus including a toner delivery system, a printhead structure containing a plurality of apertures adapted to transport toner therethrough which toner is supplied by said delivery system to the vicinity of said apertures and means for supporting copy substrates for movement past said printhead, said supporting means being adapted to attract toner transported from said delivery system through said printhead whereby said toner is deposited in image configuration on said copy substrate, the improvement comprising:
  - a toner deliver system including means for conditioning said toner for minimizing clogged of said apertures in said printhead and donor structure for conveying said conditioned toner from said conditioning means to areas adjacent said apertures said conditioning means including a movable member.

2. Printing apparatus according to claim 1 wherein said donor structure is adapted to gently convey said toner to said areas adjacent said apertures.

3. Printing apparatus according to claim 1 wherein said conditioning means comprises means for optimizing the charge distribution of said toner.

4. Printing apparatus according to claim 3 wherein said conditioning means comprises a magnetic brush.

5. Printing apparatus according to claim 4 including means for electrically biasing said magnetic brush to thereby create an electrostatic field for effecting movement of said toner from said magnetic brush to said donor structure.

6. Apparatus according to claim 5 including means for electrically biasing said donor structure to thereby produce a weak oscillating energy field for effecting gentle movement of said toner from said donor structure to said areas adjacent said apertures.

7. Apparatus according to claim 6 wherein said donor structure comprises a roll member supported for rotation intermediate said magnetic brush and said printhead structure.

8. Apparatus according to claim 7 including means for electrically biasing said supporting means to thereby create an electronic field for attracting toner to said substrate.

9. Apparatus according to claim 8 wherein said printhead sturcture comprises a plurality of control electrodes and a continuous shield electrode on opposite sides of the printhead structure.

10. Apparatus according to claim 9 wherein said donor structure is spaced approximately 0.006 inch from said printhead structure.

11. Apparatus according to claim 10 wherein said supporting means positions said substrate approximately 0.005 inch from said printhead.

12. Apparatus according to claim 11 including means for periodically removing toner adhered to said printhead.

13. Toner delivery apparatus for presenting toner to a printhead structure, said toner delivery system comprising:

means for conditioning said toner for minimizing clogging of said apertures in said printhead and donor structure for conveying said conditioned toner from said conditioning means to areas adjacent said apertures said conditioning means including a movable member.

14. Apparatus according to claim 13 wherein said donor structure is adapted to gently convey toner to areas adjacent apertures in said printhead.

15. Apparatus according to claim 14 wherein said conditioning means comprises means for optimizing the charge distribution of said toner.

16. Apparatus according to claim 15 wherein said conditioning means comprises a magnetic brush.

17. Apparatus according to claim 16 including means for electrically biasing said magnetic brush to thereby create an electrostatic field for effecting movement of said toner from said magnetic brush to said donor structure.

18. Apparatus according to claim 17 including means for electrically biasing said donor structure to thereby produce a weak oscillating energy field for effecting gentle movement of said toner from said donor structure to said areas adjacent said apertures.

19. Apparatus according to claim 18 wherein said donor structure comprises a roll member supported for rotation intermediate said magnetic brush and said printhead structure.

20. Apparatus according to claim 19 wherein said donor structure is spaced approximately 0.006 inch from said printhead structure.

21. Apparatus according to claim 20 including means for periodically removing toner adhered to said printhead.

* * * * *